United States Patent Office 2,934,571
Patented Apr. 26, 1960

2,934,571

DINITRATED AROMATIC COMPOUNDS AND METHOD FOR THEIR PRODUCTION

Giovanni A. Bonetti, Wilmington, Del., assignor to The Atlantic Refining Company, Philadelphia, Pa., a corporation of Pennsylvania No Drawing. Application February 6, 1958
Serial No. 713,572

22 Claims. (Cl. 260—645)

This invention relates to dinitrated aromatic compounds and to a method for their production. More specifically, this invention relates to a method for the production of dinitrated aromatic compounds by the nitration of a mononuclear aromatic compound having the general formula

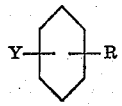

wherein R is hydrogen, halogen or an alkyl radical containing from 1 to 24 carbon atoms which alkyl radical may be either normal or branched in structure, and wherein Y is hydrogen or a nitro radical, and to the novel dinitrated alkyl aromatic compounds having from 9 to 24 carbon atoms in the alkyl radical.

Prior to the present invention two-step processes were required for the dinitration of mononuclear aromatic compounds, and moreover the dinitration of alkyl aromatic compounds containing more than about six to eight carbon atoms in the alkyl radical had not been accomplished. As taught by the prior art, in order to prepare the known dinitrated mononuclear aromatic compounds the aromatic compound was first mononitrated with a mixture of concentrated nitric acid (70 percent, sp. gr. approx. 1.42) and concentrated sulfuric acid (96 percent, sp. gr. approx. 1.84) at reaction temperatures between 0° C. and 20° C. and for reaction times of at least two hours. According to many investigators, however, the maximum nitrating action was obtained with sulfuric acid of 90 percent concentration. The mononitrated compound (whether it was prepared as a step in the process of preparing the dinitro compound or whether it was available as a starting material) was then either heated to a temperature of from 40° C. to 90° C. in the presence of additional amounts of the same nitration mixture, or the compound was treated at the same reaction temperature (i.e. about 20° C.) with a stronger nitration mixture composed of more concentrated nitric acid and concentrated sulfuric acid. A reaction time of at least two hours was required to introduce the second nitro radical into the ring.

Moreover it was believed impossible to prepare dinitro aromatic compounds by introducing two nitro groups simultaneously into the nucleus of a mononuclear aromatic compound. This was believed true not only with compounds such as benzene, toluene, chlorobenzene or other low molecular weight substituted benzenes, but also it was believed to be particularly true in the case of long chain alkyl benzenes. This belief was based on the supposition that no dinitration of the benzene nucleus could be accomplished either because of steric hindrance or because of the supposition that the long alkyl chain (i.e. greater than six carbon atoms) would be oxidized or "burnt off." It is particularly noteworthy that workers in this field have been successful only recently in the preparation of long chain mononitroalkyl benzenes.

A method has now been found for the production of dinitrated aromatic compounds either from non-nitrated aromatic or mononitro substituted aromatic compounds in which the reaction may be carried out over an extremely wide temperature range with exceedingly short reaction times.

It is therefore an object of this invention to provide a method for nitrating over a wide temperature range and for exceedingly short reaction times mononuclear aromatic compounds of the general formula:

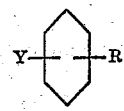

wherein R is hydrogen, halogen or an alkyl radical having from 1 to 24 carbon atoms which alkyl radical may be either normal or branched in structure and wherein Y is either hydrogen or a nitro radical.

It is a further object of this invention to provide a process for the simultaneous introduction of two nitro radicals into the nucleus of mononuclear aromatic compounds having the general formula:

wherein R is hydrogen, halogen, or an alkyl radical containing from 1 to 24 carbon atoms and which alkyl radical, may be either normal or branched in structure.

It is a further object of this invention to provide novel dinitroalkylbenzenes wherein the alkyl radical attached to the benzene ring contains from 9 to 24 carbon atoms and wherein the alkyl radical may be either normal or branched in structure.

In accordance with this invention a mononuclear aromatic compound such as benzene, nitrobenzene, halogen-substituted benzene, halogen-substituted nitrobenzene, a monoalkyl benzene, or a monoalkyl mononitro benzene is treated with a mixture of fuming nitric acid and fuming sulfuric acid. It has been found that the nitration is substantially instantaneous, i.e. the reaction is similar in speed to the speed of an ionic reaction. It has been found also that the reaction is temperature independent over a very wide temperature range. Immediately after mixing the reactants the reaction is complete and the reaction mixture is poured onto crushed ice or into cold water to produce an aqueous acid phase and an organic phase. The organic phase containing the dinitrated product is washed successively with water, 5 percent aqueous NaOH, and finally with water until neutral. The washed product, which may be either in the form of a liquid or a crystalline solid, is recovered by distillation at low pressures or recrystallization from a suitable solvent such as ethyl alcohol, respectively.

The term fuming nitric acid as used in this specification and appended claims shall mean nitric acid of specific gravity of at least 1.49. The term also includes the so-called 100 percent nitric acid and "red fuming" nitric acid.

The term fuming sulfuric acid as used in this specification and appended claims refers to sulfuric acid containing free $SO_3$ particularly acid containing about 0.25 mol of free $SO_3$ per 100 grams of solution, known commercially as 20 percent oleum. Fuming acids having $SO_3$ concentrations above and below commercial 20 percent oleum also may be used preferably however those having a specific gravity above 1.85.

The nitration reaction should be conducted under substantially anhydrous conditions for the successful application of the process of this invention. These conditions are obtained by the use of the fuming sulfuric acid, since the $SO_3$ in the acid reacts with a portion of the water formed in the nitration reaction to produce additional sulfuric acid, and the sulfuric acid forms "hydration" complex compounds with water, $H_2SO_4 \cdot xH_2O$, thus removing all the water from the reaction. It is desirable in the present invention to wash the crude dinitro aromatic hydrocarbon product with a dilute solution of sodium hydroxide or similar alkaline compounds to remove trace amounts of acidic compounds produced during the dinitration reaction, for example, those compounds wherein a nitro radical is substituted for a hydrogen on the alkyl radical.

In a preferred embodiment of this invention two nitro groups are introduced simultaneously into the nucleus of a mononuclear aromatic compound by adding 1 mol of a mononuclear aromatic compound such as benzene, a halogen-substituted benzene or an alkyl substituted benzene wherein the alkyl radical contains from 1 to 24 carbon atoms (in particular from 9 to 24 carbon atoms for the production of the novel compounds of this invention) to a nitrating mixture composed of 2.1 to 8.0 mols of fuming nitric acid (calculated as $HNO_3$) and 0.5 to 8.0 mols of free $SO_3$ as contained in commercial 20 percent to 23 percent fuming sulfuric acid. It has been found necessary to employ at least 0.5 mol of free $SO_3$ (contained in the fuming sulfuric acid) per mole of the aromatic compound in order to provide a completely anhydrous reaction mixture. Amounts in excess of eight mols of free $SO_3$ do not provide any technical benefit but merely add to the expense of material and increase the handling problems. Instead of adding the aromatic compound to the acid, the same ratios of fuming nitric acid and fuming sulfuric acid may be added to the aromatic compound since the order of addition is immaterial.

By theory, the reaction requires that two mols of nitric acid be consumed in the production of each mol of dinitrated compound. In order to obtain maximum yields a slight excess of nitric acid over the theoretical amount required should be used. For this reason a mol ratio of aromatic compound to fuming nitric acid of at least 1:2.1 was set forth above. It is to be noted, therefore, that if mol ratios of less than 1:2.1 of aromatic compound to nitric acid be employed, the yield of dinitrated product will be reduced.

Mol ratios of the aromatic compounds to fuming nitric acid in excess of 1:8.0 not only give no technical improvement, but, in fact, are uneconomical since they require the handling of excessive amounts of a nitration mixture which is both dangerous and expensive.

Under the upper temperature limitation of this invention (60° C.) there are only two replaceable hydrogens in the benzene nucleus and accordingly 1.05 mols of fuming nitric acid (calculated as $HNO_3$) should be employed for each gram-atom of hydrogen which is to be replaced in the benzene nucleus. The upper mol ratio of one mol of aromatic compound to eight mols of nitric acid thus may be expressed as four mols of nitric acid for each gram-atom of hydrogen to be replaced in the benzene nucleus.

In a similar manner, the range of mol ratios of aromatic compound to free $SO_3$ of 1:0.5 to 1:8 may be expressed as 0.25 to 4.0 mols of free $SO_3$ for each gram-atom of hydrogen to be replaced in the benzene nucleus.

For best control of the dinitration reaction it is preferred to use the reactants in the ratio of one mol of the aromatic compound to 2.2 to 2.5 mols of fuming nitric acid (1.1 to 1.25 mols $HNO_3$ per gram-atom of hydrogen to be replaced) and 0.6 to 1.5 mols of free $SO_3$ as contained in fuming sulfuric acid per mol of aromatic compound, which may be expressed as 0.3 to 0.75 mol of free $SO_3$ per gram-atom of hydrogen to be replaced in the aromatic compound.

As mentioned above, the method may be carried out over a wide temperature range, i.e. from −50° C. to 60° C. At temperatures above 60° C. trinitration reactions are favored and accordingly the upper limit of 60° C. is critical to this invention. The dinitration reaction may be carried out as low as −50° C. and below, although at temperatures below about −50° C. the dinitrated product becomes insoluble in the nitration mixture and crystallizes out. The heterogeneous mixture formed at the temperatures below −50° C. prevents thorough mixing of the reactants with the result that it becomes difficult to prevent the formation of local overheating or "hot spots" in the reaction mixture. Accordingly, temperatures above about −50° C. are preferred. The temperature range most preferred for the process from the standpoint of ease of control of the reaction lies between 0° C. and 50° C.

Immediately upon completion of the reaction the reaction mass is poured into cold water or onto crushed ice. A syrupy liquid will be obtained from the relatively high molecular weight aromatic compounds, while crystalline precipitates will be formed from the relatively low molecular weight aromatic compounds. The liquid products may be purified further by vacuum distillation, whereas the crystalline products may be purified by recrystallization from solvents such as ethyl alcohol by well known methods.

In another embodiment of this invention a second nitro radical is introduced into the nucleus of a mononitro mononuclear aromatic compound by adding one mol of a mononuclear aromatic compound such as mononitrobenzene, monohalo mononitrobenzene or a mononitro alkyl benzene wherein the alkyl radical contains from 1 to 24 carbon atoms to a nitrating mixture composed of 1.05 to 4.0 mols of fuming nitric acid and 0.25 to 4.0 mols free $SO_3$ as contained in commercial oleum preferably 20 percent to 23 percent fuming sulfuric acid.

Since in the nitration of a mononitro compound under the conditions set forth for this invention there will be only one replaceable hydrogen in the benzene nucleus, the amount of fuming nitric acid to be employed will amount to 1.05 mols of fuming nitric acid per gram-atom of hydrogen to be replaced, such amount being, of course, a slight excess over the theoretical amount required. This is the same number of mols of fuming nitric acid per gram-atom of hydrogen to be replaced as set forth in the above described embodiment wherein non-nitrated mononuclear aromatic compounds are treated to produce the dinitrated compounds.

The preferred amount of fuming nitric acid in this embodiment of the invention likewise preferably ranges between 1.1 to 1.25 mols of fuming nitric acid per gram-atom of hydrogen to be replaced which range corresponds to the range for the dinitration embodiment of the invention.

The amount of free $SO_3$ contained in the fuming sulfuric acid likewise may be expressed in terms of mols of free $SO_3$ per gram-atom of hydrogen to be replaced in the benzene nucleus and as in the case of the dinitration reaction described above this will range between 0.25 and 4.0 mols of free $SO_3$ (contained in the fuming sulfuric acid) per gram-atom of hydrogen to be replaced and preferably range between 0.3 and 0.75 mol of free $SO_3$ (contained in the fuming sulfuric acid) per gram-atom of hydrogen to be replaced.

It will be noted that although the same ratios of fuming nitric acid and free $SO_3$ per replaceable hydrogen atom are employed in both the dinitration and mononitration embodiments of this invention, in the dinitration reaction the number of mols of fuming nitric acid and free $SO_3$ required is twice the number of mols required in the mononitration reaction when these numbers are expressed in relation to the mols of aromatic compound to be reacted.

The mononitration reaction may be carried out over the same temperature ranges as described above for the dinitration reaction, i.e. from −50° C. to 60° C. The reaction is again substantially instantaneous and the products are recovered by pouring the reaction mass either into cold water or onto ice followed by the above described washing steps and vacuum distillation or recrystallization steps.

The following examples will serve to define certain specific aspects of the invention and illustrate preferred modes of operation but are not to be construed as limiting the invention thereto.

EXAMPLE I

To a nitration mixture composed of 69.3 grams (1.1 mols) fuming nitric acid (sp. gr. 1.49+) and 200 grams of fuming sulfuric acid containing 0.5 mol free $SO_3$ in a three necked flask fitted with a thermometer, stirrer and dropping funnel, there was added 39 grams (0.5 mol) of benzene keeping the temperature at from 5° C. to 10° C. After the addition of the benzene was completed the reaction mass was poured onto crushed ice. There was formed a light yellow crystalline precipitate which was filtered off and recrystallized from ethyl alcohol. The crystalline product had a melting point of 88° C. (uncorrected), and the yield was 80.5 grams of dinitro benzene (compound identified by elemental analysis, melting point and the usual derivatives) representing 96 percent of the theoretical yield.

EXAMPLE II

To a nitrating mixture composed of 69.3 grams (1.1 mols) of fuming nitric acid (sp. gr. 1.49+) and 300 grams of fuming sulfuric acid containing 0.75 mol of free $SO_3$ contained in a three necked flask fitted with a stirrer, thermometer and dropping funnel, there was added 46 grams (0.5 mol) of toluene at 5° C. to 10° C. Immediately after the addition of the toluene, the reaction mass was poured onto crushed ice and there was formed a precipitate of yellowish crystals. These crystals, when recrystallized from ethyl alcohol, had a melting point of 69° C. (uncorrected) and yielded 87 grams of dinitro toluene (identified by elemental analysis, melting point and the usual derivatives) representing 96 percent of the theoretical yield.

EXAMPLE III

To a nitrating mixture composed of 69.3 grams (1.1 mols) of fuming nitric acid (sp. gr. 1.49+) and 300 grams of fuming sulfuric acid containing 0.75 mol of free $SO_3$ contained in a three necked flask fitted with a stirrer, thermometer and dropping funnel, there was added 56.3 (0.5 mol) of chlorobenzene at 15° C. to 20° C. Immediately after the addition of the chlorobenzene, the reaction mass was poured on crushed ice forming a yellowish crystalline precipitate. The crystals were filtered and washed several times with water and then melted under hot water to remove any residual acid. Upon filtering and drying there was produced 99 grams of dinitro chlorobenzene (identified by elemental analysis and the usual derivatives) representing 97.5 percent of the theoretical yield.

The above examples demonstrate that the process of this invention may be employed to prepare the known lower molecular weight dinitrated compounds from the corresponding non-nitrated compounds at a reaction rate which is substantially instantaneous and at yields closely approaching the theoretical maximum of 100 percent.

These known lower molecular weight compounds also have many well known uses particularly as intermediates in the preparation of explosives, dyes and foam plastics.

The hydrocarbon starting material employed in the synthesis of the novel compounds of this invention is an alkyl benzene in which the alkyl radical contains 9 to 24 carbon atoms. Such alkyl benzenes may be prepared by a variety of well known methods, for example by the alkylation of benzene with a straight or branched chain olefin having 9 to 24 carbon atoms, in the presence of a catalyst such as $AlCl_3$, HF, $H_2SO_4$, $BF_3$ or similar acid type catalyst. The olefin may be obtained from the polymerization of propylene over phosphoric acid or similar catalyst or by the polymerization of butylenes, etc.

Another method of preparation involves the reaction of an alcohol, containing from 9 to 24 carbon atoms, with benzene in the presence of such catalysts as $H_2SO_4$, $BF_3$, $BF_3$—$H_2SO_4$, $BF_3$—$H_3PO_4$, or $AlCl_3$. The alcohols may be obtained, for example, by the reaction of an olefin with carbon monoxide and hydrogen in the well known "Oxo" process or by the oxidation of paraffinic hydrocarbons.

A third method of preparation of the alkyl benzenes employs a chlorinated hydrocarbon having 9 to 24 carbon atoms. These compounds react with benzene in the presence of a Friedel-Crafts catalyst such as aluminum chloride. The alkyl halide may be obtained conveniently by chlorinating a petroleum fraction.

These alkyl benzenes also may be prepared by reacting benzene with an acyl halide of the formula RCOCl wherein R represents an alkyl chain having from 8 to 23 carbon atoms in the presence of aluminum chloride to form a corresponding ketone. This ketone may then be hydrogenated using a palladium or nickel catalyst and hydrogenation conditions similar to that used in the well-known Clemmensen reaction to form suitable alkyl benzenes for use in the present invention.

The foregoing methods of preparing the alkyl benzenes suitable for use in this invention have been described in detail both in patents and in the technical literature and since such methods do not fall within the scope of this invention they will not be discussed further, it being sufficient to emphasize that any alkyl benzene having 9 to 24 carbon atoms in the alkyl radical may be employed irrespective of its method of preparation.

The following examples are presented to show the preparation of the novel high molecular weight compounds of this invention, i.e. the dinitrated alkyl benzenes wherein the alkyl group contains from 9 to 20 carbon atoms.

EXAMPLE IV

An alkyl benzene fraction predominately nonyl benzene was prepared by the commercial $AlCl_3$ catalytic alkylation of benzene with a propylene polymer fraction having an average of 9 carbon atoms in the molecule. This alkyl benzene fraction which boiled at 111° C. to 118° C. at 6 mm. mercury pressure was dinitrated by adding 62 grams (0.32 mol) of this nonyl benzene to a mixture of 50.4 grams (0.8 mol) of fuming nitric acid and 150 grams of 20 percent fuming sulfuric acid containing 0.37 mol free $SO_3$. The addition was conducted at 15° C. to 25° C. After the addition was completed the reaction mass was immediately poured onto crushed ice, extracted with benzene and washed with water, then washed with aqueous 5 percent NaOH and finally with water and dried over $MgSO_4$. Upon distillation of the dried material there was obtained 84 grams of dinitrononylbenzene boiling between 188° C. and 205° C. at 3 mm. Hg pressure which amount corresponds to a yield of 90 percent of theoretical. This compound, which underwent the typical reactions of a dinitroalkyl benzene was found to have a nitrogen content of 9.3 as compared with a theoretical content of 9.5 indicating a very high degree of purity.

EXAMPLE V

A dodecylbenzene fraction was prepared by the commercial $AlCl_3$ catalytic alkylation of benzene with a propylene polymer fraction having an average of 12 carbon atoms in the molecule. This alkylbenzene fraction which boiled between 135° C. and 145° C. at 3 mm. mercury pressure was dinitrated in the following manner.

To a mixture of 69.3 grams (1.1 mols) of fuming nitric acid (sp. gr. 1.5) and 200 grams of 20 percent fuming sulfuric acid containing 0.5 mol of free $SO_3$, there was added, at 15° C. to 20° C. and under anhydrous conditions, 123 grams (0.5 mol) of the dodecylbenzene. After the addition of the dodecylbenzene was completed the reaction mass was poured on crushed ice and extracted with benzene. The benzene layer was washed successively with water, aqueous 5 percent NaOH, water and finally distilled.

There was obtained 130 grams (corresponding to approximately an 80 percent yield) of dinitrododecyl benzene boiling at 202° C. to 220° C. at 5 mm. mercury pressure. The elemental analysis of the product is set forth in Table I.

*Table I*

| Compound | Boiling Range | Percent C | Percent H | Percent N |
| --- | --- | --- | --- | --- |
| Dodecylbenzene | 135–145° C./3 mm | [1] 87.80 [2] 88.10 | [1] 12.19 [2] 12.10 |  |
| Dinitrododecylbenzene | 202–220° C./5 mm | [1] 64.28 [2] 64.40 | [1] 8.33 [2] 9.10 | [1] 8.33 [2] 8.40 |

[1] Calculated theoretical composition.
[2] Found by analysis.

It is thus apparent from the foregoing table of analytical results that even though the starting material was not pure dodecylbenzene, rather pure dinitrododecyl benzene was prepared therefrom as shown by the exceptionally good nitrogen comparison.

EXAMPLE VI

An alkyl benzene predominantly dodecyl benzene prepared as in Example V was mononitrated in the following manner.

To 123 grams (0.5 mol) of dodecyl benzene obtained as in Example V there was added 185 grams of a nitration mixture composed of 60 grams (0.954 mol) of concentrated nitric acid (sp. gr. approx. 1.42) and 125 grams (1.27 mols) of concentrated sulfuric acid (sp. gr. 1.84). The nitration acid was added to the aromatic compound at 25° C. to 30° C. with stirring. After the addition of the acid was completed, the reaction mass was further agitated for one hour at 40° C. to 45° C. The reaction mass was then poured onto crushed ice and the organic phase separated and washed successively with water, aqueous 5 percent NaOH and finally with water until neutral and distilled under a reduced pressure of about 0.5 mm. of mercury pressure. Upon distillation there was obtained 135 grams of mononitro dodecyl benzene (identified by elemental analysis) boiling at 140° C. to 150° C. at 0.5 mm. of mercury pressure.

The above produced mononitro dodecyl benzene was further reacted in accordance with the present invention in the following manner.

A nitrating mixture composed of 21.6 grams (0.344 mol) of fuming nitric acid (sp. gr. 1.49+) and 70 grams of fuming sulfuric acid (sp. gr. 1.9) containing 0.175 mol of free $SO_3$ was placed in a three-necked flask fitted with a thermometer, stirrer and dropping funnel. To this mixture there was added 100 grams (0.344 mol) of the mononitro dodecyl benzene at 15° C. to 20° C. Immediately upon completion of the addition of the mononitro dodecyl benzene the reaction mass was poured onto crushed ice and there was formed an aqueous acid phase and a syrupy yellowish organic phase. The organic phase was separated and dissolved in benzene and washed successively with water, aqueous 5 percent NaOH and finally with water until neutral and distilled under a reduced pressure of about 5 mm. of mercury. There was obtained 80 grams (70 percent of theory based on the mononitrododecyl benzene) of dinitro dodecyl benzene boiling between 202° C. and 220° C. at 5 mm. of mercury pressure which compound also was identified by elemental analysis.

It will be noted in this example that the mol ratio of mono-nitrated aromatic hydrocarbon to fuming nitric acid was only 1:1, thus there was not the slight excess of acid which, it has been pointed out, is necessary for high yields. As a consequence of this low mol ratio the yield of dinitrated product was markedly lower than the yields obtained in the other examples wherein the proper mol ratio was employed. Nevertheless this example demonstrates that the process of this invention is completely effective in instantaneously introducing a second nitro radical into the benzene ring of a mono-nitrated benzene compound.

EXAMPLE VII

An alkyl benzene predominantly octadecyl benzene was prepared by reacting an excess of benzene with octadecene in the presence of aluminum chloride as a catalyst. This material which boiled at 212° C. to 220° C. at 4 mm. pressure was further reacted in accordance with the present invention in the following manner.

To 165 grams (0.5 mol) of octadecyl benzene obtained as above there was added a nitrating mixture composed of 69.3 grams (1.1 mols) of fuming nitric acid (sp. gr. 1.49+) and 150 grams of 20 percent fuming sulfuric acid containing 0.37 mol of free $SO_3$. The addition of the acid was conducted at 40° C. to 45° C. and after the addition was complete the reaction mixture was poured onto crushed ice. There was formed an aqueous acid phase and a syrupy yellowish organic phase. The organic phase was dissolved in benzene and washed successively with water, aqueous 5 percent NaOH and finally with water until neutral and distilled under a reduced pressure of about 0.6 mm. of mercury. There was produced 188 grams (corresponding to a yield of approximately 90 percent) of dinitro octadecyl benzene (identified by elemental analysis) boiling at 251° C. to 259° C. at 0.6 mm. mercury pressure. The nitrogen content of the product was found to be approximately 6.9 percent as compared with a nitrogen content of 6.7 according to theory, thus demonstrating the high purity of the dinitro octadecyl benzene product.

In order to demonstrate the necessity for using both fuming nitric acid and fuming sulfuric acid as the nitration mixture for the process of the instant invention the following experiments were carried out.

EXAMPLE VIII

To a nitrating mixture composed of 28.2 grams (0.44 mol) of fuming nitric acid (sp. gr. 1.5) and 81 grams (0.8 mol) of concentrated (96%) sulfuric acid in a three-necked flask fitted with a stirrer, thermometer and dropping funnel there was added 50 grams (0.20 mol) of a dodecyl benzene fraction having a boiling range of 293°–298° C. with vigorous agitation at 25°–30° C. Upon completion of the addition of the dodecyl benzene the entire mixture was poured immediately onto crushed ice. The organic layer was extracted with benzene and the benzene layer was washed with water, a 5 percent aqueous NaOH solution, additional water until neutral and then dried over $MgSO_4$. Upon distillation at a reduced pressure of 2 mm. of mercury, the dried product separated into two fractions—one fraction of 13.6 grams boiled at 120°–126° C. (at 2 mm. Hg) and the other fraction of 41.0 grams boiled at 177°–186° C. (at 2 mm. Hg). The first fraction was composed of unchanged dodecyl benzene and the second fraction was composed of mononitro dodecyl benzene. No dinitro compound was formed in the reaction.

EXAMPLE IX

Exactly the same reactants as in Example VIII were mixed at 20°–30° C. and as soon as the addition was completed the temperature of the mixture was raised to 56°–59° C. and was stirred for two hours at this temperature. The mixture was then poured onto ice and the organic layer extracted with benzene, washed with water, a 5 percent aqueous NaOH solution, additional water until neutral and dried over MgSO₄. It was noticed that during the washing with the dilute NaOH a large amount of extract was obtained indicating that there was either side chain nitration or side chain degradation during the nitration reaction. The dried organic layer was distilled and it yielded 52.3 grams of mononitro dodecyl benzene which had a boiling range of 174°–183° C. at 2 mm. mercury pressure. No dinitro compound was found in any of the products.

EXAMPLE X

To a nitration mixture composed of 40 grams of concentrated (70%) nitric acid (0.44 mol) and 600 grams of 20 percent fuming sulfuric acid containing 1.5 mols of free SO₃ contained in a three-necked flask fitted with stirrer, thermometer and dropping funnel there was added 50 grams (0.20 mol) of a dodecyl benzene fraction having a boiling range of 293°–298° C. The dodecyl benzene was introduced slowly with strong stirring and cooling to keep the temperature at from 25°–28° C. As soon as the addition was completed the mixture was poured onto ice and a brown, tacky material separated. On addition of water this material dissolved almost completely and it was found that instead of nitrating the dodecyl benzene, the dodecyl benzene had been sulfonated. No dinitration of any kind was found.

It will be seen from these experiments that it is necessary to use both fuming nitric acid and fuming sulfuric acid in order to obtain dinitrated products according to the method of this invention.

It will be apparent also that these findings are contrary to the classical nitration procedures for the production of low molecular weight dinitro compounds wherein combinations of fuming nitric acid with concentrated sulfuric acid or concentrated nitric acid with fuming sulfuric acid have been employed together with high reaction temperatures and long reaction times. It should also be pointed out, however, that none of these classical methods could be used for the simultaneous introduction of two nitro groups into an aromatic nucleus.

In each of Examples I to VII inclusive the 2,4-dinitro isomer was produced predominantly with only small amounts of the other isomers being formed. Moreover, in addition to these Examples I to VII, numerous experiments were carried out at reaction temperatures down to —50° C., and these experiments also gave high yields of dinitrated products in which the 2,4-dinitro isomer predominated. These additional experiments also show that it was preferable to use amounts of fuming sulfuric acid only slightly in excess of that necessary to maintain anhydrous conditions in the reaction system in order to obtain the highest yields of dinitrated products. Large excesses of fuming sulfuric acid over the fuming nitric acid or in excess of the amount required to react with the water produced in the reaction generally reduced the amount of dinitrated product.

The dinitro compounds produced by the method of this invention are useful as chemical intermediates in the preparation of foam plastics, explosives, dyes, etc. For example, the nitro group may be reduced by the usual chemical means to produce the corresponding diamines which in turn may be reacted with phosgene to produce the diisocyanates, which materials are particularly useful in the preparation of foam plastics, coatings, etc. Similarly, the diamines may be used in the preparation of a wide variety of diazo dyes. In particular the novel dinitro alkyl benzenes of this invention in which the alkyl group contains from 9 to 24 carbon atoms have been used to prepare novel long chain alkyl benzene diisocyanates which compounds form the subject matter of an application filed of even date herewith to Giovanni A. Bonetti and Vincent J. Keenan entitled "Long Chain Alkylbenzene Diisocyanates." These novel long chain alkylbenzene diisocyanates are prepared by first reducing the corresponding dinitro alkylbenzenes of the present invention to the corresponding diamines by standard reduction reactions and further reacting the resulting diamines with phosgene under suitable conditions to produce the high molecular weight alkylbenzene diisocyanates in which the alkyl group attached directly to the benzene nucleus contains 9 to 24 carbon atoms. These alkylbenzene diisocyanates have been polymerized by the well known methods of condensation polymerization to produce foam plastics, solid plastics, coating compositions and other types of plastics.

I claim:

1. A process for the nitration of a mononuclear aromatic compound having the general formula:

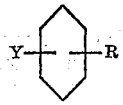

wherein Y is selected from the group consisting of hydrogen and a nitro radical and when Y is hydrogen, R is selected from the group consisting of halogen, hydrogen and an alkyl radical containing from 1 to 24 carbon atoms and when Y is a nitro radical, R is selected from the group consisting of halogen, and an alkyl radical containing from 9 to 24 carbon atoms which comprises intimately contacting the mononuclear aromatic compound with a nitration mixture composed of fuming nitric acid and fuming sulfuric acid at a temperature of from —50° C. to 60° C. and recovering the product containing two nitro radicals from the reaction mixture.

2. A process for the nitration of a mononuclear aromatic compound having the general formula:

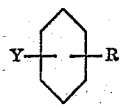

wherein Y is selected from the group consisting of hydrogen and a nitro radical and when Y is hydrogen, R is selected from the group consisting of halogen, hydrogen and an alkyl radical containing from 1 to 24 carbon atoms and when Y is a nitro radical, R is selected from the group consisting of halogen and an alkyl radical containing from 9 to 24 carbon atoms which comprises intimately contacting the mononuclear aromatic compound with a nitration mixture composed of fuming nitric acid and fuming sulfuric acid at a temperature of from —50° C. to 60° C., the amount of fuming nitric acid ranging between 1.05 and 4.0 mols of acid for each gram-atom of hydrogen to be replaced in the nucleus of the mononuclear aromatic compound and the amount of free SO₃ contained in the fuming sulfuric acid ranging between 0.25 and 4.0 mols of free SO₃ for each gram-atom of hydrogen to be replaced in the nucleus of the mononuclear aromatic compound and recovering the product containing two nitro radicals from the reaction mixture.

3. A process for the nitration of a mononuclear aromatic compound having the general formula:

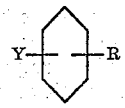

wherein Y is selected from the group consisting of hydrogen and a nitro radical and when Y is hydrogen, R is selected from the group consisting of halogen, hydrogen and an alkyl radical containing from 1 to 24 carbon atoms and when Y is a nitro radical, R is selected from the group consisting of halogen and an alkyl radical containing from 9 to 24 carbon atoms which comprises intimately contacting the mononuclear aromatic compound with a nitration mixture composed of fuming nitric acid and fuming sulfuric acid at a temperature of from 0° C. to 50° C., the amount of fuming nitric acid ranging between 1.05 and 4.0 mols of acid for each gram-atom of hydrogen to be replaced in the nucleus of the mononuclear aromatic compound and the amount of free $SO_3$ contained in the fuming sulfuric acid ranging between 0.25 and 4.0 mols of free $SO_3$ for each gram-atom of hydrogen to be replaced in the nucleus of the mononuclear aromatic compound and recovering the product containing two nitro radicals from the reaction mixture.

4. A process for the nitration of a mononuclear aromatic compound having the general formula:

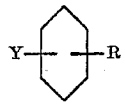

wherein Y is selected from the group consisting of hydrogen and a nitro radical and when Y is hydrogen, R is selected from the group consisting of halogen, hydrogen and an alkyl radical containing from 1 to 24 carbon atoms, and when Y is a nitro radical, R is selected from the group consisting of halogen and an alkyl radical containing from 9 to 24 carbon atoms which comprises intimately contacting the mononuclear aromatic compound with a nitration mixture composed of fuming nitric acid and fuming sulfuric acid at a temperature of from —50° C. to 60° C., the amount of fuming nitric acid ranging between 1.1 and 1.25 mols of acid for each gram-atom of hydrogen to be replaced in the nucleus of the mononuclear aromatic compound and the amount of free $SO_3$ contained in the fuming sulfuric acid ranging between 0.3 and 0.75 mol of free $SO_3$ for each gram-atom of hydrogen to be replaced in the nucleus of the mononuclear aromatic compound and recovering the product containing two nitro radicals from the reaction mixture.

5. A process for the simultaneous introduction of two nitro radicals into a mononuclear aromatic compound having the general formula:

wherein R is selected from the group consisting of hydrogen, halogen and an alkyl radical containing from 1 to 24 carbon atoms which comprises intimately contacting the mononuclear aromatic compound with a nitration mixture composed of fuming nitric acid and fuming sulfuric acid at a temperature of from —50° C. to 60° C. and recovering the product containing two nitro radicals from the reaction mixture.

6. A process for the simultaneous introduction of two nitro radicals into a mononuclear aromatic compound having the general formula:

wherein R is selected from the group consisting of hydrogen, halogen and an alkyl radical containing from 1 to 24 carbon atoms which comprises intimately contacting the mononuclear aromatic compound with a nitration mixture composed of fuming nitric acid and fuming sulfuric acid at a temperature of from —50° C. to 60° C., the amount of fuming nitric acid ranging between 1.05 and 4.0 mols of acid for each gram-atom of hydrogen to be replaced in the nucleus of the mononuclear aromatic compound and the amount of free $SO_3$ contained in the fuming sulfuric acid ranging between 0.25 and 4.0 mols of free $SO_3$ for each gram-atom of hydrogen to be replaced in the nucleus of the mononuclear aromatic compound and recovering the product containing two nitro radicals from the reaction mixture.

7. A process for the simultaneous introduction of two nitro radicals into a mononuclear aromatic compound having the general formula:

wherein R is selected from the group consisting of hydrogen, halogen and an alkyl radical containing from 1 to 24 carbon atoms which comprises intimately contacting the mononuclear aromatic compound with a nitration mixture composed of fuming nitric acid and fuming sulfuric acid at a temperature of from 0° C. to 50° C., the amount of fuming nitric acid ranging between 1.05 and 4.0 mols of acid for each gram-atom of hydrogen to be replaced in the nucleus of the mononuclear aromatic compound and the amount of free $SO_3$ contained in the fuming sulfuric acid ranging between 0.25 and 4.0 mols of free $SO_3$ for each gram-atom of hydrogen to be replaced in the nucleus of the mononuclear aromatic compound and recovering the product containing two nitro radicals from the reaction mixture.

8. A process for the simultaneous introduction of two nitro radicals into a mononuclear aromatic compound having the general formula:

wherein R is selected from the group consisting of hydrogen, halogen and an alkyl radical containing from 1 to 24 carbon atoms which comprises intimately contacting the mononuclear aromatic compound with a nitration mixture composed of fuming nitric acid and fuming sulfuric acid at a temperature of from —50° C. to 60° C., the amount of fuming nitric acid ranging between 1.1 and 1.25 mols of acid for each gram-atom of hydrogen to be replaced in the nucleus of the mononuclear aromatic compound and the amount of free $SO_3$ contained in the fuming sulfuric acid ranging between 0.3 and 0.75 mol of free $SO_3$ for each gram-atom of hydrogen to be replaced in the nucleus of the mononuclear aromatic compound and recovering the product containing two nitro radicals from the reaction mixture.

9. A process for the introduction of a second nitro radical into the nucleus of a mononuclear aromatic compound having the general formula:

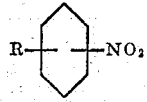

wherein R is selected from the group consisting of halogen and an alkyl radical containing from 9 to 24 carbon atoms which comprises intimately contacting the mononuclear aromatic compound with a nitration mixture composed of fuming nitric acid and fuming sulfuric acid at a temperature of from —50° C. to 60° C. and recovering the product containing two nitro radicals from the reaction mixture.

10. A process for the introduction of a second nitro group into the nucleus of a mononuclear aromatic compound having the general formula:

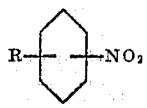

wherein R is selected from the group consisting of halogen and an alkyl radical containing from 9 to 24 carbon atoms which comprises intimately contacting the mononuclear aromatic compound with a nitration mixture composed of fuming nitric acid and fuming sulfuric acid at a temperature of from —50° C. to 60° C., the amount of fuming nitric acid ranging between 1.05 and 4.0 mols of acid for each gram-atom of hydrogen to be replaced in the nucleus of the mononuclear aromatic compound and the amount of free SO₃ contained in the fuming sulfuric acid ranging between 0.25 and 4.0 mols of free SO₃ for each gram-atom of hydrogen to be replaced in the nucleus of the mononuclear aromatic compound and recovering the product containing two nitro radicals from the reaction mixture.

11. A process for the introduction of a second nitro group into the nucleus of a mononuclear aromatic compound having the general formula:

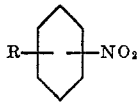

wherein R is selected from the group consisting of halogen and an alkyl radical containing from 9 to 24 carbon atoms which comprises intimately contacting the mononuclear aromatic compound with a nitration mixture composed of fuming nitric acid and fuming sulfuric acid at a temperature of from —50° C. to 60° C., the amount of fuming nitric acid ranging between 1.1 and 1.25 mols of acid for each gram-atom of hydrogen to be replaced in the nucleus of the mononuclear aromatic compound and the amount of free SO₃ contained in the fuming sulfuric acid ranging between 0.3 and 0.75 mols of free SO₃ for each gram-atom of hydrogen to be replaced in the nucleus of the mononuclear aromatic compound and recovering the product containing two nitro radicals from the reaction mixture.

12. A process for the preparation of dinitro benzene by simultaneously introducing two nitro radicals into the benzene ring which comprises intimately contacting benzene with a nitration mixture composed of fuming nitric acid and fuming sulfuric acid at a temperature of from 0° C. to 50° C., the amount of fuming nitric acid ranging between 2.1 and 8.0 mols of acid for each mol of benzene and the amount of free SO₃ contained in the fuming sulfuric acid ranging between 0.5 and 8.0 mols of free SO₃ for each mol of benzene and recovering dinitro benzene from the reaction mixture.

13. A process for the preparation of dinitro toluene by simultaneously introducing two nitro radicals into the benzene ring of the toluene which comprises intimately contacting toluene with a nitration mixture composed of fuming nitric acid and fuming sulfuric acid at a temperature of from 0° C. to 50° C., the amount of fuming nitric acid ranging between 2.1 and 8.0 mols of acid for each mol of toluene and the amount of free SO₃ contained in the fuming sulfuric acid ranging between 0.5 and 8.0 mols of free SO₃ for each mol of toluene and recovering dinitro toluene from the reaction mixture.

14. A process for the preparation of dinitro-chlorobenzene by simultaneously introducing two nitro radicals into the benzene ring of the chlorobenzene which comprises intimately contacting chlorobenzene with a nitration mixture composed of fuming nitric acid and fuming sulfuric acid at a temperature of from 0° C. to 50° C., the amount of fuming nitric acid ranging between 2.1 and 8.0 mols of acid for each mol of chlorobenzene and the amount of free SO₃ contained in the fuming sulfuric acid ranging between 0.5 and 8.0 mols of free SO₃ for each mol of chlorobenzene and recovering dinitrochlorobenzene from the reaction mixture.

15. A process for the preparation of dinitrododecyl benzene by simultaneously introducing two nitro radicals into the benzene ring of the dodecyl benzene which comprises intimately contacting dodecyl benzene with a nitration mixture composed of fuming nitric acid and fuming sulfuric acid at a temperature of from 0° C. to 50° C., the amount of fuming nitric acid ranging between 2.1 and 8.0 mols of acid for each mol of dodecyl benzene and the amount of free SO₃ contained in the fuming sulfuric acid ranging between 0.5 and 8.0 mols of free SO₃ for each mol of dodecyl benzene and recovering dinitrododecyl benzene from the reaction mixture.

16. A process for the preparation of dinitro octadecyl benzene by simultaneously introducing two nitro radicals into the benzene ring of the octadecyl benzene which comprises intimately contacting octadecyl benzene with a nitration mixture composed of fuming nitric acid and fuming sulfuric acid at a temperature of from 0° C. to 50° C., the amount of fuming nitric acid ranging between 2.1 and 8.0 mols of acid for each mol of octadecyl benzene and the amount of free SO₃ contained in the fuming sulfuric acid ranging between 0.5 and 8.0 mols of free SO₃ for each mol of octadecyl benzene and recovering dinitrooctadecyl benzene from the reaction mixture.

17. A process for the preparation of dinitrododecyl benzene by introducing a second nitro radical into the benzene ring of the mononitro dodecyl benzene which comprises intimately contacting mononitrododecyl benzene with a nitration mixture composed of fuming nitric acid and fuming sulfuric acid at a temperature of from 0° C. to 50° C., the amount of fuming nitric acid ranging between 1.05 and 4.0 mols of acid for each mol of the mnonitro dodecyl benzene and the amount of free SO₃ contained in the fuming sulfuric acid ranging between 0.25 and 4.0 mols of free SO₃ for each mol of the mononitro dodecyl benzene and recovering the dinitrododecyl benzene from the reaction mixture.

18. Dinitro alkyl benzenes of the general formula:

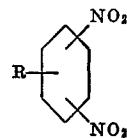

wherein R is an alkyl group having 9 to 24 carbon atoms.

19. The dinitroalkylbenzenes according to claim 18 wherein the alkyl group is selected from the group consisting of straight and branched chains.

20. Dinitrononyl benzene.
21. Dinitrododecyl benzene.
22. Dinitro octadecyl benzene.

References Cited in the file of this patent
FOREIGN PATENTS
490,951    Canada _____ Mar. 3, 1953

UNITED STATES PATENT OFFICE

CERTIFICATE OF CORRECTION

Patent No. 2,934,571 April 26, 1960

Giovanni A. Bonetti

It is hereby certified that error appears in the printed specification of the above numbered patent requiring correction and that the said Letters Patent should read as corrected below.

Column 6, line 42, for "9 to 20" read -- 9 to 24 --; column 14, line 38, for "mnonitro" read -- mononitro --.

Signed and sealed this 20th day of September 1960.

(SEAL)
Attest:
KARL H. AXLINE
Attesting Officer

ROBERT C. WATSON
Commissioner of Patents